United States Patent
Michel (10) Patent No.: US 9,578,870 B1
(45) Date of Patent: Feb. 28, 2017

(54) REPLACEABLE SOUNDBOARD INSERTS AND STRIKER MEMBER ATTACHMENT FOR A BOX CALL

(71) Applicant: Deadly Calls, LLC, Cresco, PA (US)

(72) Inventor: Thomas J. Michel, Cresco, PA (US)

( * ) Notice: Subject to any disclaimer, the term of this patent is extended or adjusted under 35 U.S.C. 154(b) by 355 days.

(21) Appl. No.: 13/911,606

(22) Filed: Jun. 6, 2013

(51) Int. Cl.
*A01M 31/00* (2006.01)

(52) U.S. Cl.
CPC ................................. *A01M 31/004* (2013.01)

(58) Field of Classification Search
CPC .............................. A01M 31/004; A63H 5/00
USPC ........................................................ 446/397
See application file for complete search history.

(56) References Cited

U.S. PATENT DOCUMENTS

| | | | | | |
|---|---|---|---|---|---|
| 4,343,108 | A | * | 8/1982 | Lee ..................... | A01M 31/004 446/397 |
| 4,422,262 | A | * | 12/1983 | Moss ............................ | 446/397 |
| 4,846,753 | A | * | 7/1989 | Langston ....................... | 446/397 |
| 5,178,575 | A | * | 1/1993 | Koch ............................ | 446/397 |
| 5,380,235 | A | * | 1/1995 | Forbes ................ | A01M 31/004 446/397 |
| 5,562,521 | A | * | 10/1996 | Butler et al. .................. | 446/397 |
| 5,607,091 | A | * | 3/1997 | Musacchia .......... | A01M 31/004 108/43 |
| 5,830,036 | A | * | 11/1998 | Richardson ......... | A01M 31/004 446/397 |
| 5,846,119 | A | * | 12/1998 | Long ............................. | 446/397 |
| 6,149,492 | A | * | 11/2000 | Davis, Jr. ...................... | 446/397 |
| 6,149,493 | A | * | 11/2000 | Long .................. | A01M 31/004 446/397 |
| 6,168,493 | B1 | * | 1/2001 | Kirby ............................ | 446/418 |
| 6,308,876 | B1 | * | 10/2001 | Havens ......................... | 224/661 |
| 6,669,528 | B2 | * | 12/2003 | Kaelin .......................... | 446/397 |
| 6,695,674 | B1 | * | 2/2004 | Davis et al. .................. | 446/418 |
| 7,575,500 | B1 | * | 8/2009 | Salter et al. .................. | 446/397 |
| 7,980,915 | B2 | * | 7/2011 | Burcham ............ | A01M 31/004 43/1 |
| 8,142,253 | B2 | * | 3/2012 | Peel .................... | A01M 31/004 446/397 |
| 8,235,763 | B1 | * | 8/2012 | Burcham ...................... | 446/397 |
| 8,672,134 | B2 | * | 3/2014 | Sprada et al. ................ | 206/531 |
| 2006/0252341 | A1 | * | 11/2006 | Olinde ......................... | 446/202 |
| 2008/0020674 | A1 | * | 1/2008 | Olinde .......................... | 446/397 |
| 2008/0280525 | A1 | * | 11/2008 | Carr .............................. | 446/397 |
| 2009/0258569 | A1 | * | 10/2009 | Wade .................. | A01M 31/004 446/418 |

* cited by examiner

*Primary Examiner* — Aarti B Berdichevsky
*Assistant Examiner* — Dolores Collins
(74) *Attorney, Agent, or Firm* — Joe D. Calhoun (57) ABSTRACT

A single box call having a plurality of replaceable soundboard inserts and a plurality of replaceable striker members, selectively used in combination together for producing distinctly different sounds that imitate turkey calls. The box call includes a housing having two receiving slots for receiving two soundboard inserts and a fastening means for fastening the soundboard inserts to the housing; and a lid assembly having a lid, a handle, a connecting means for connecting the lid assembly to the housing, a replaceable striker member, and an attachment means for attaching the striker member to the bottom of the lid.

20 Claims, 6 Drawing Sheets

REPLACEABLE SOUNDBOARD INSERTS AND STRIKER MEMBER ATTACHMENT FOR A BOX CALL

CROSS-REFERENCE TO RELATED APPLICATIONS

Not applicable.

FEDERALLY SPONSORED RESEARCH AND DEVELOPMENT

Not applicable.

BACKGROUND OF THE INVENTION

1. Field of the Invention

The present invention relates to a game call device that produces sounds that imitate the sounds of a wild turkey's call. More particularly, the invention relates to a box call having a plurality of replaceable soundboard inserts and a lid assembly having a plurality of striker members that are selectively combined to produce sounds that imitate a turkey's call.

2. Description of Arguably Related Art Including Information Disclosed 37 CFR 1.97 and 1.98.

Game call devices, such as box calls, are hunting accessories that may be used to attract wild game toward the user. Some wild game, for example, turkeys (including without limitation gobblers, hens, other wild turkeys, or other comparable avian), may not respond to the sounds produced by a particular game call device. Some reasons a turkey may not respond include, without limitation, the turkey's individual personality and gender, the breeding cycles, the time of year, the weather conditions, and the terrain. To effectively increase the chances of a turkey responding to the user, the user typically must bring several different box calls to the field to produce various sounds. The term "field" refers to any location for used hunting and/or observing wild game, preferably turkey. It is often cumbersome for a user to carry more than one box call device in addition to the other hunting gear and accessories typically carried.

Generally a box call is a hand-held box or housing having a base, two opposing upstanding end blocks (or end walls), two opposing upstanding side walls, and a lid having a striker member. The base, end blocks, and side walls form a sound chamber. Each side wall includes a soundboard, each of which may be made from different materials, preferably wood. A soundboard may produce a particular sound quality, tone, or pitch that is different or distinguishable from the sound quality or pitch produced by a soundboard made from a different material. Differences in the sounds produced may vary according to different species of wood, variations in wood grains, densities of the wood, and hardness of the wood. The striker member may be a striker or other implement (collectively, the "strike member") for striking against the soundboard or the top of the side wall. The lid may be pivotably attached to or near the top of one of the end blocks. A user may use multiple box calls in the field, with each box call made from any combination of different materials for the striker member and/or soundboards to produce different sounds.

Generally to use a box call, the user slides the striker member against the top edge of at least one of the soundboards. This friction produces vibrations that are transformed into sound waves that mimic various turkey sounds. Each soundboard may be permanently integrated into the side wall or otherwise temporarily attached to the box call. Some box calls further include soundboard inserts that must be installed or removed with tools. However, carrying and using tools may not be practical while in the field.

U.S. Patent Application Publication No. 2009/0258569 filed by Wade discloses a box member having side walls, a handle portion disposed on one end of the box member, and an inner chamber portion. A lid member is engaged with a top portion of the end wall of the box member and a top portion of the side walls. A removable striker member is also disclosed. At least one insert is insertable into a cavity formed in an outer portion of the bottom of the box member.

U.S. Patent Application Publication Nos. 2006/0252341 and 2008/0020674 filed by Olinde disclose a turkey call that combines the capabilities of a box call and a pot call. The turkey call comprises a striker member, and a box having a closed bottom, an open top, two end walls, and two side walls. Each side wall defines an opening for receiving an insert, with the insert being made from a material different than that used for making the enclosure.

None of the patents or published patent applications listed expressly discloses a game call device, preferably a box call, comprising a housing having a base, two opposing upstanding end blocks, and two opposing upstanding side walls; a lid assembly pivotably attached to (or connected to) one the end blocks with the lid assembly having a lid, at least one of a plurality of striker members and a connecting means for pivotably connecting the lid assembly onto the housing; at least one of a plurality of removable soundboard inserts, wherein each end block, each side wall, and the base further including at least one receiving slot for receiving a soundboard insert, and a fastening means for fastening each insert simultaneously.

SUMMARY OF THE INVENTION

In a preferred embodiment, the invention is a game call device, preferably a box call, for calling and attracting a turkey. The box call comprises (including or having) a housing having a base, two opposing upstanding end blocks (or end walls), two opposing upstanding side walls, and at least one receiving slot (or opening) within each of the side walls, each lateral side of the base, and/or end blocks. At least one of a plurality of replaceable soundboard inserts for selectively inserting one of the inserts into one of the receiving slots, and a fastening means for simultaneously fastening each soundboard insert to the housing; and a lid assembly having a lid (or a top or a paddle), at least one of a plurality of replaceable striker members for selectively attaching to the lid with an attachment means, and a connecting means for pivotably locking (or otherwise connecting) the lid to the housing. The assembly of the base, the side walls, and the end blocks form a sound chamber within the housing. The striker member is used to strike, slide, rub or otherwise provide contact against the upper portion of one or both of the soundboard inserts. Each soundboard insert and the striker member may be easily and quickly removed and replaced (or interchanged) without using tools. Each soundboard insert and the striker member may be made from the same or different materials or woods. Changing the soundboard inserts allows the user to customize the sounds produced by the box call. The invention also includes a method of using the box call to attract a turkey by replacing one or more soundboard inserts and striker members for a single box call.

It is a primary object of the present invention to provide a box call having a plurality of soundboard inserts and a plurality of striker members, each made from the same or different materials or woods, and being capable of producing distinctly different turkey sounds from a single box call.

It is another object of the present invention to provide a box call having a plurality of replaceable and interchangeable soundboard inserts and striker members to allow a user to easily carry multiple soundboard inserts and striker members in the field.

It is another object of the present invention to provide a box call having soundboard inserts and striker members that may be installed and/or removed without using tools.

It is yet another object of the invention to provide an improved box call that is user-friendly and practical.

It is yet another object of the invention to provide a quick-release and simple attachment means without the use of tools.

It is another object of the invention to provide a fastening means for simultaneously fastening the soundboard inserts to the housing.

Other objects will be apparent from a reading of the written description disclosed herein, together with the claims.

The broken lines are for illustrative purposes only, and do not form part of the claimed invention.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the conjunctive "and" may also be taken to include the disjunctive "of," and vice versa, whenever necessary to give the claims of this patent application the broadest interpretation and construction possible. Likewise, when the plural form is used, it may be taken to include the singular form, and vice versa.

The invention disclosed herein is not limited by construction materials to the extent that such materials satisfy the structural and/or functional requirements. For example, any material may be used so long as it satisfies the function for which it is being used.

In one embodiment, the invention is a game call, preferably a box call comprising (including or having):
(a) a housing having at least one receiving slot, at least one of a plurality of soundboard inserts insertable into the receiving slot to form a sound chamber for producing one or more sounds being substantially similar to one or more of a turkey's calls, and a fastening means for simultaneously fastening each of the soundboard inserts to the housing; and
(b) a lid assembly having a lid, an attachment means for selectively attaching one of a plurality of striker members to the lid, and a connecting means for pivotably connecting the lid assembly to the housing.

In another preferred embodiment, a box call comprises: a housing having a first upstanding end block (or end wall) having a bore on its top face, a second upstanding end block (or end wall), two upstanding opposing side walls, and a base. Each end block abuts an end of the base and each side wall abuts the lateral end of the base. Two receiving slots are located near each end of the end bocks and abut into the base and the side walls; the receiving slots may be angled, extend downwardly, or may be essentially perpendicular to the base. The slot may further extend downwardly near each respective end block, base, and side wall. At least two soundboard inserts are each insertable into each of the receiving slots. A fastening means simultaneously fastens the soundboard inserts to the housing. The lid assembly includes a lid, an attachment means for selectively attaching one of a plurality of striker members to the lid, and a connecting means for pivotably connecting the lid assembly to the housing.

The box call is a portable tool having components that may be easily assembled in the field. It may also be waterproof. The box call may be made from materials selected from the group consisting of all different woods, synthetic materials, acrylics, plastics, glass, slate, aluminum, metals, minerals, natural materials, man-made materials, and combinations thereof. The woods may be selected from the group consisting of walnut, mahogany, cherry, purple heart, poplar, ebony, holly, chinaberry, teak, cedar, butternut, sassafass, ponderosa, pine, maple and combinations thereof. Due to the design and function of the soundboard inserts and the striker members, the user may easily carry more than one of the soundboard inserts and striker members to the field. For example, a user can carry approximately fifteen (15) soundboard inserts and five (5) striker members for use with the customized box call to produce numerous distinctly different combinations of sounds. This is in contrast to the user needing to carry multiple average-sized box calls to produce the same number of sound combinations, or needing to use tools for assembly.

Figure 1:
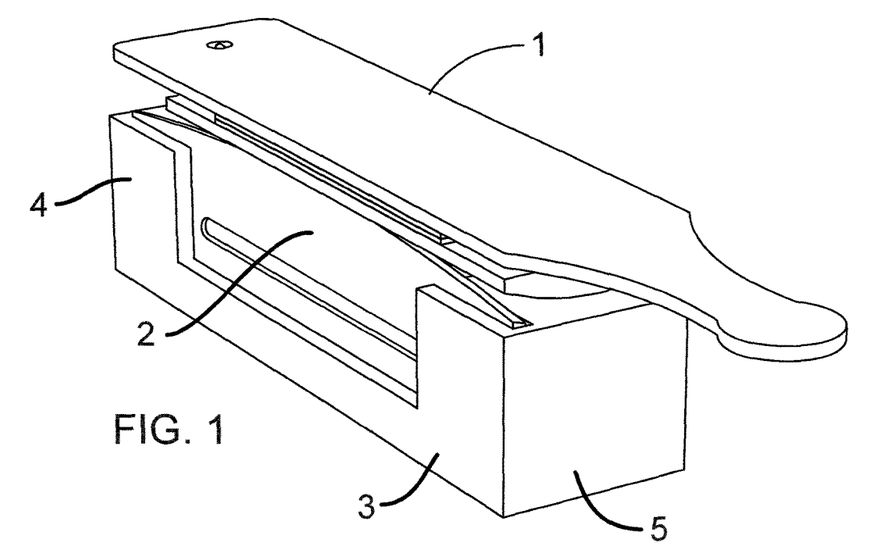
FIG. 1 is a perspective view of one embodiment of the box call, showing the lid assembly in a closed configuration, and the soundboard inserts and the striker member attachment installed on the box call.
Figure 2:
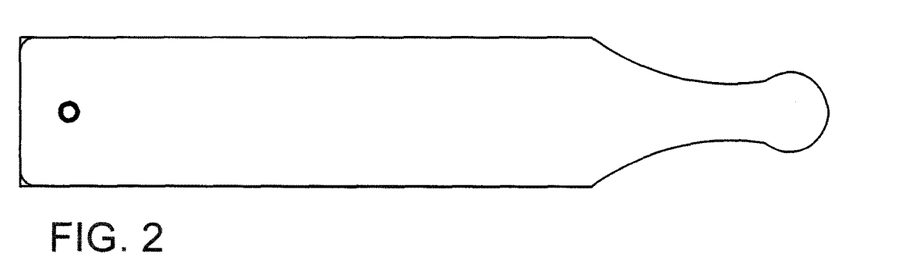
FIG. 2 is a top plan view of FIG. 1 thereof.
Figure 3:
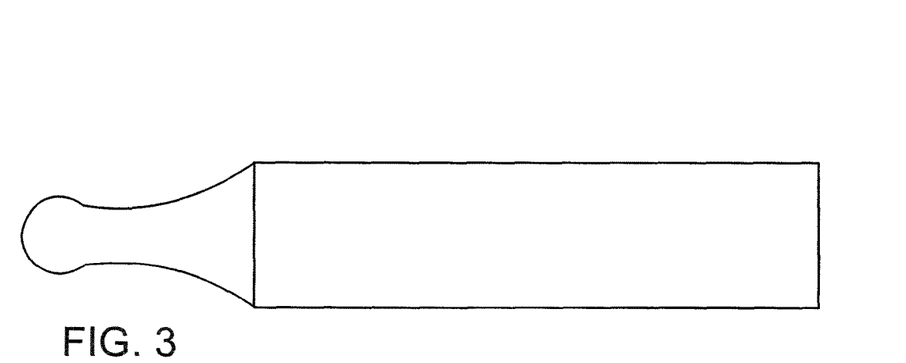
FIG. 3 is a bottom plan view of FIG. 1 thereof.
Figure 4:
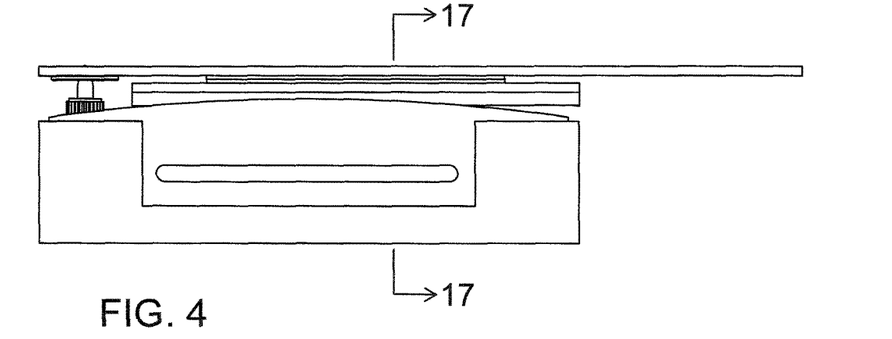
FIG. 4 is a left side elevation view of FIG. 1 thereof.
Figure 5:
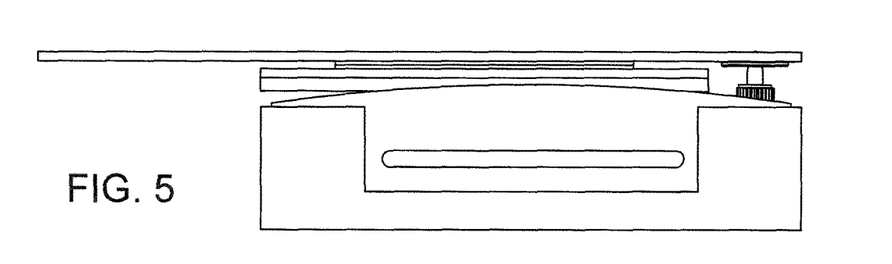
FIG. 5 is a right side elevation view of FIG. 1 thereof.
Figure 6:
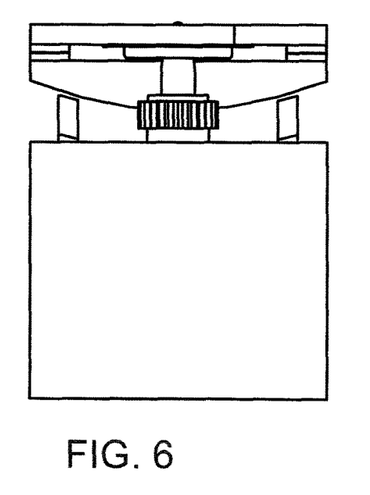
FIG. 6 is a front elevation view of FIG. 1 thereof.
Figure 7:
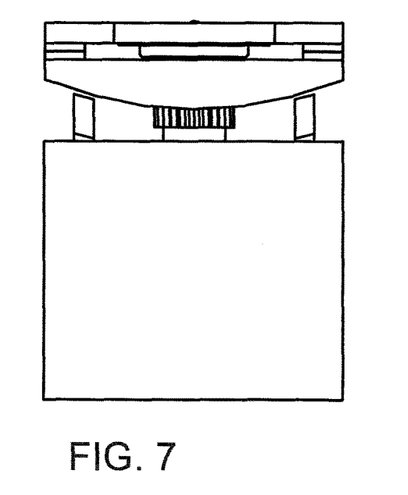
FIG. 7 is a rear elevation view of FIG. 1 thereof.
Figure 8:
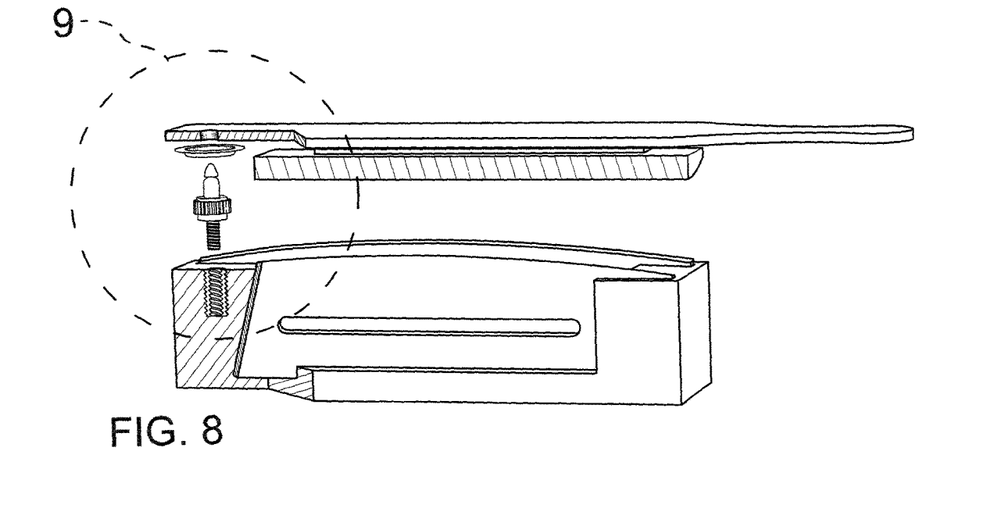
FIG. 8 is a partial cross-section of a perspective view of FIG. 1 thereof, showing the connecting means disassembled and positioned in relation to the striker member and the housing.
Figure 9:
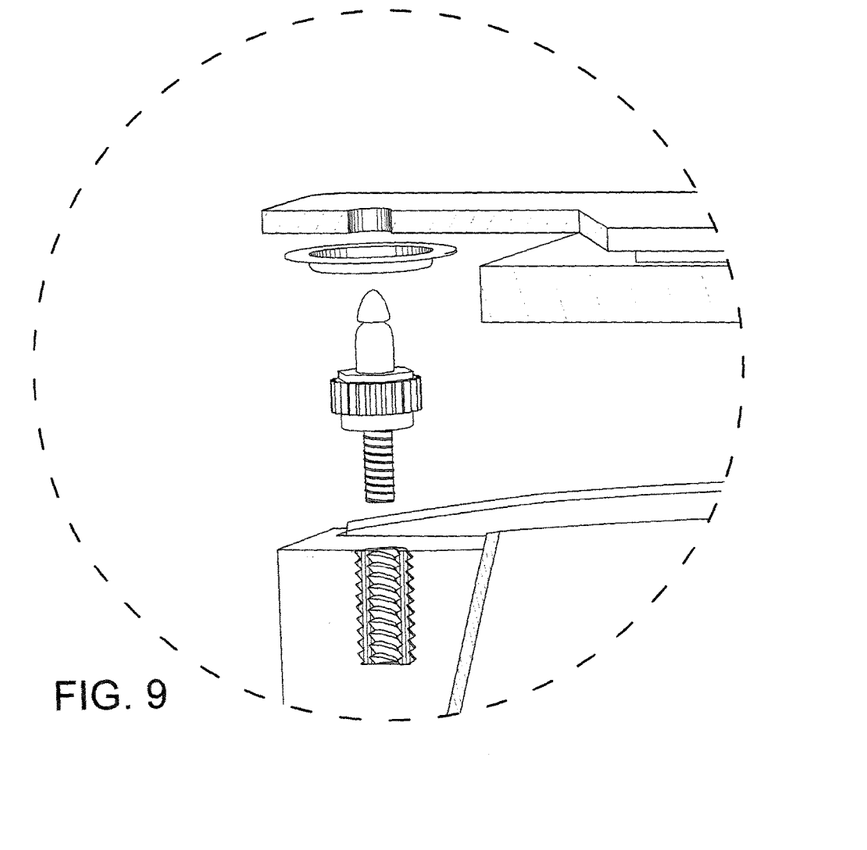
FIG. 9 is a close-up, partial cross-section view of FIG. 8 thereof.

As depicted in FIG. 1, the lid assembly 1 is substantially parallel to the base 3 when the lid assembly 1 is in a closed position or configuration. In a preferred embodiment, the base 3, the side walls 4, and the end blocks 5 form a single, integrated (or permanent) component. In one embodiment, the housing is made (in whole or in part) of plastic. The base 3 extends upwardly on each lateral side to connect with each respective end block 5, forming the side walls 4. In another embodiment, the base 3 is temporarily mounted to one (or both) end block(s) 5 (not shown). When installed, the soundboard inserts 2 complete the side walls 4 of the box call. These components form a sound chamber. The sound chamber produces sound vibrations, tones, and pitches that mimic the sounds produced by a turkey.

Figure 10:
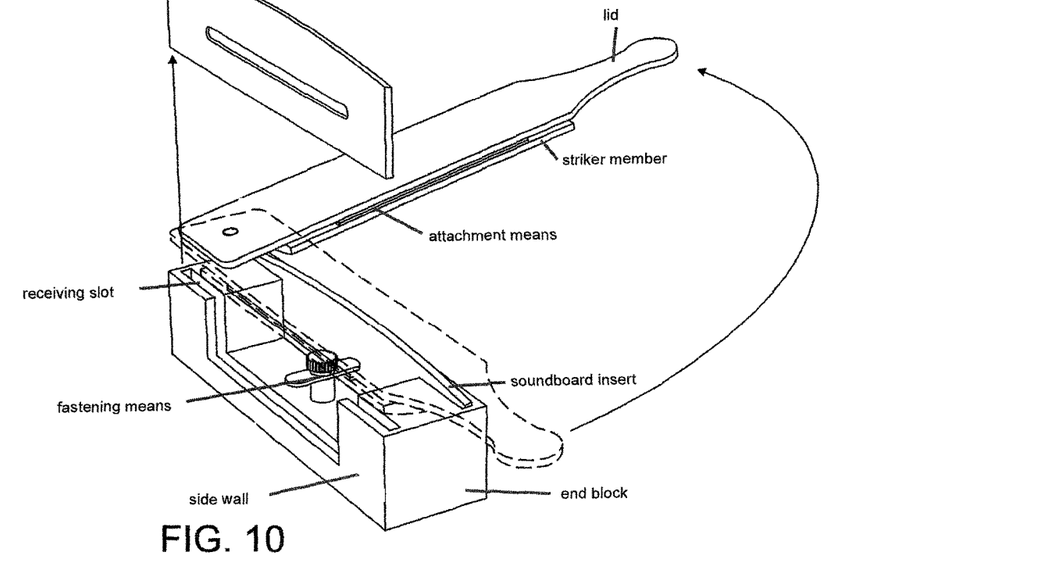
FIG. 10 is another perspective view of FIG. 1 thereof, showing the fastened position of the fastening means with one the soundboard inserts removed for clarity, and the pivotal rotation of the lid assembly from a closed configuration to an open configuration.
Figure 17:
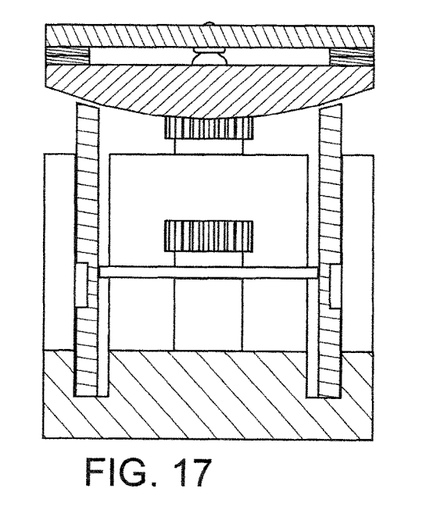
FIG. 17 is a cross-section rear elevation view of FIG. 1 thereof, showing the fastening means and lid assembly in closed configurations, and with the soundboard inserts installed.
Figure 18:
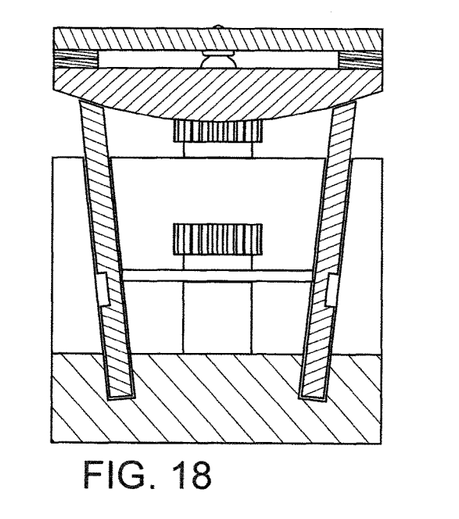
FIG. 18 is a cross-section rear elevation view of another embodiment of FIG. 1 thereof, showing the fastening means and lid assembly in closed configurations, with the soundboard inserts installed, and with the slots positioned at an angle; all other views are the same as the previous figures.

The top of the front end block 5 also includes a bore (not shown) for receiving a connecting means 9 that pivotably connects (and rotatably secures) the lid assembly 1 to the box call. A receiving slot (or opening or gap) located within each side wall 4 and outside each end block 5 receives the soundboard insert 2 (FIGS. 1 and 10). The slot extends downwardly and partially into the base 3. The slot in the side wall 4 may be in any shape, size, or configuration that serves the purpose of holding the soundboard insert 2. For example, the slot may allow the soundboard insert 2 to be placed at a right angle or any other angle in relation to the base 3. The slot may have an angle including without limitation, between approximately 0 and 8 degrees. One purpose for this angle is to enhance the acoustics in the sound chamber, and to direct the sound waves out of the sound chamber wherein the top of each soundboard insert 2 is of equal or greater distance apart from the lower half of the soundboard insert 2. In FIG. 17, the slot is in a 0 degree configuration. In FIG. 18, the slot is in an approximate 6 degree configuration.

In one embodiment, the housing has a length of 7¼ inches, a height of 1⅝ inches, and a width of 1⅞ inches. The upstanding portion of each side wall has a width of 1¼ inches, with the gap or cutout having a width of 4½ inches and a height of 1⅛ inches. This leaves a ½ inch height of the base side wall. Each receiving slot has a depth of approximately 1⅜ inches at approximately 0° and/or 6° angles extending downwardly and width of approximately ⅛ inches. The opening of each slot provides a snug fit for each soundboard insert.

No tools are needed to replace or install the soundboard inserts or the striker members. Tools are also not needed to remove the lid assembly. This avoids the risk that one of the fastening or locking components is dropped and lost during installation or removal. The box call will be rendered inoperable if the user attempts to use it without first installing and securing two soundboard inserts, because the sound chamber would not be formed and the sound would not be produced. The soundboard inserts are lightweight and small enough that several may be easily carried into the field for use. In one embodiment, at least eight (8) soundboard inserts and at least five (5) striker members 6 are available, with each soundboard insert and striker member 6 being made from either the same or different materials. Different combinations of soundboard inserts and striker members 6 can be used with the box call to produce at least forty (40) distinctly different combinations of turkey calls. Table 1 includes, without limitation, five combinations of wood for striker member and soundboard inserts that may used with the box call.

TABLE 1

Suggested Selection of Wood Combinations for Striker Member and Soundboard Inserts

| Replaceable Striker Member Material | and | Replaceable Soundboard Insert Material |
|---|---|---|
| Red Cedar | and | Butternut, Yellow Poplar, Red Cedar. |
| Black Cherry | and | Butternut, Yellow Poplar, Red Cedar, Mahogany, Sassafras, Black Cherry. |
| Black Walnut | and | Butternut, Yellow Poplar, Red Cedar, Sassafras, Mahogany, Black Cherry, Black Walnut. |
| Hard Maple | and | Butternut, Yellow Poplar, Red Cedar, Mahogany, Black Walnut, Black Cherry, Hard Maple. |
| Purple Heart | and | Butternut, Yellow Poplar, Red Cedar, Sassafras, Black Cherry, Black Walnut, Hard Maple. |

The soundboard inserts are reusable. Providing an array of soundboard inserts and striker members allows the user to conveniently and easily adjust the frequency, tone, pitch, and volume of the sounds produced. The variety of soundboard inserts and striker members eliminates the need for a user to bring multiple box calls to the field. The different sounds produced by this box call may be selected from the group consisting of yelps, clucks, cuts, purrs, putts, kee kees, cackles, gobbles, assembly calls, tree calls, and combinations thereof.

Each soundboard insert 2 may include an arcuate (or arched or curved) panel having one or more grooves 10 recessed into the outside face of the soundboard insert 2 (FIG. 1). Alternatively, each soundboard insert may eliminate the groove (not shown). The bottom of the lid 1 (and consequently the striker member 6) rubs, slides, strikes or otherwise contacts the top of the panel, with the user making adjustments to the speed and number of repetitions of contact, as the desired sound is produced. The groove 10 aids in increasing the frequency of resonation in the soundboard insert 2, and also serves as a handgrip or finger grip during installation or removal of the soundboard insert 2. Replacing a soundboard insert 2 in the field may be easily accomplished provided that at least one of the user's hands is free to operate and disengage the fastening means 8. Each soundboard insert 2 may be made from woods selected from the group consisting of butternut, poplar, yellow poplar, sassafras, mahogany, red cedar, cherry, black cherry, walnut, black walnut, purple heart, ebony, holly, chinaberry, teak, cedar, ponderosa pine, maple, hard maple, African mahogany and combinations thereof.

In one embodiment, each soundboard insert has a depth (or thickness) of approximately ⅛ inches, a length of 7 inches, an outside end height of 1 7/16 inches, and an outer center height of 1 11/16 inches. The inner center height may be 1 21/32 inches, with an inner edge height of 1 13/32 inches. The groove may have a depth of 3/64 inches and a height of 1/4 inches. The groove may be located approximately 5/8 inches from the bottom of the soundboard insert and 1 9/16 inches from each side of the soundboard insert.

The fastening means 8 simultaneously fastens each soundboard insert 2 to the housing. The base 3 further includes a threaded pilot hole (not shown) for receiving the fastening means. In one embodiment, the fastening means includes a spacer inserted into the threaded pilot hole, a cam or elongated plate inserted into the spacer and rotatable simultaneously against the inner side of each soundboard insert, and a thumb screw. The spacer may be a standoff member having a female member and a male member. The spacer may be threaded into the threaded pilot hole. The thumb screw may be turned to loosen or tighten the grip on the cam, wherein the cam may be rotated from a fastened position within the soundboard insert to an unfastened position.

Figure 11:
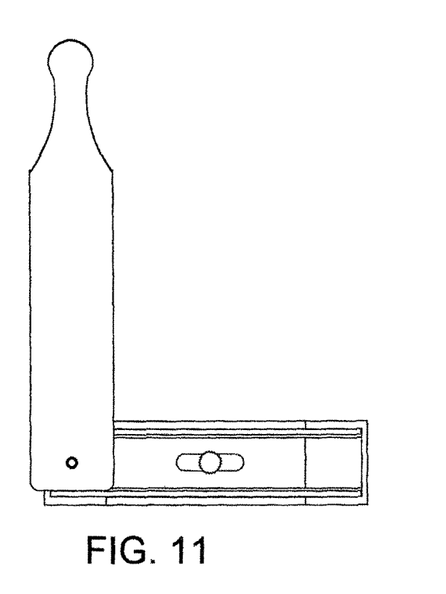
FIG. 11 is a top plan view of FIG. 1 thereof, showing the lid assembly in an open configuration and the connecting means in an open, unlocked configuration.
Figure 12:
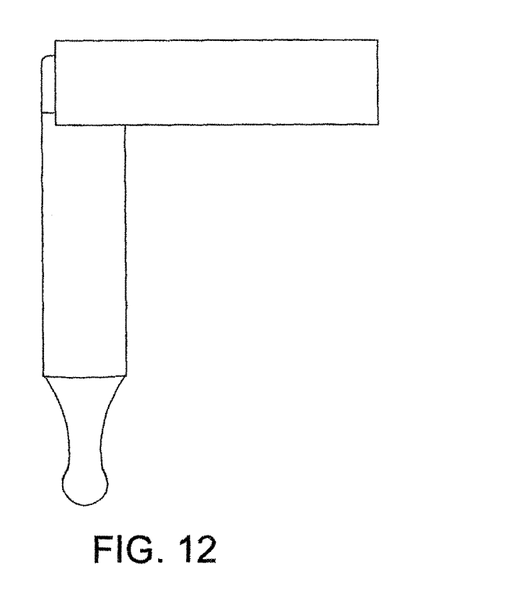
FIG. 12 is a bottom plan view of FIG. 1 thereof, showing the lid assembly in an open configuration.
Figure 13:
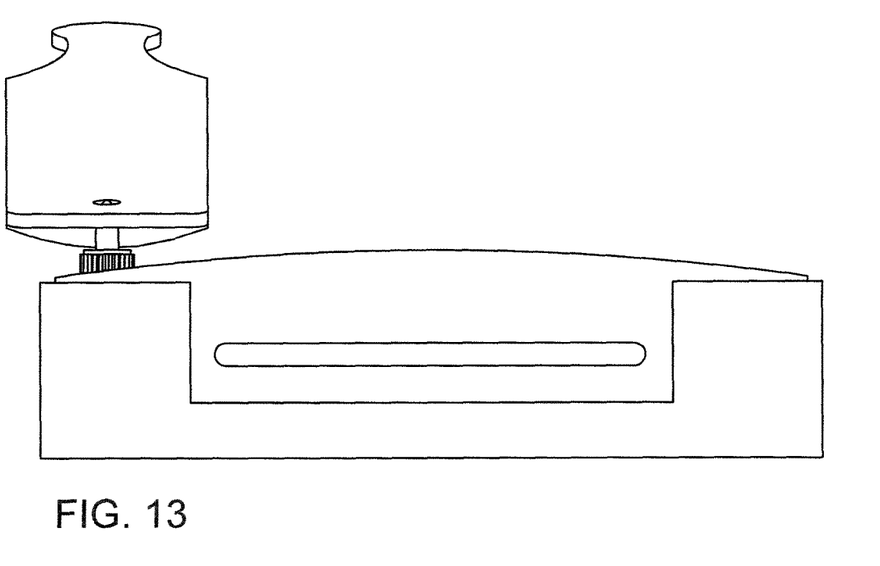
FIG. 13 is a left side elevation view of FIG. 1 thereof, showing the lid assembly in an open configuration, and the soundboard insert installed.
Figure 14:
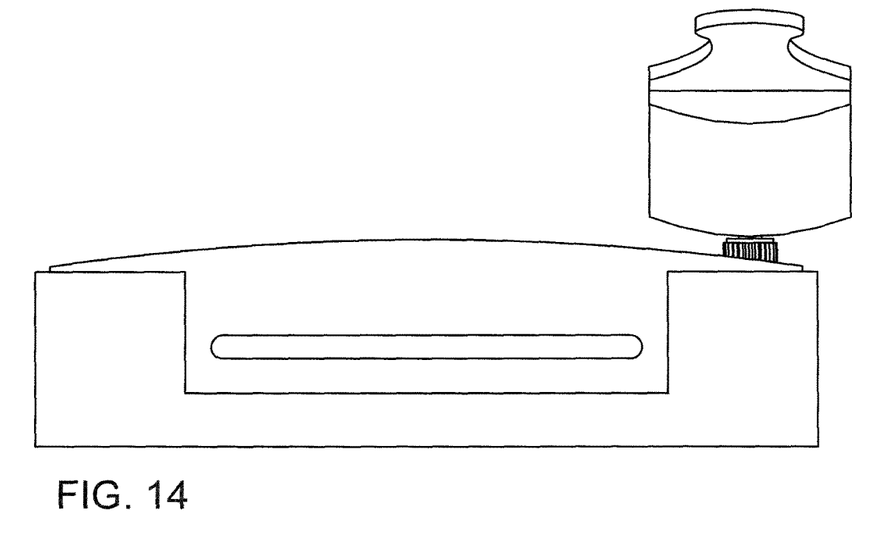
FIG. 14 is a right side elevation view of FIG. 1 thereof, showing the lid assembly in an open configuration, and the soundboard insert installed.
Figure 15:
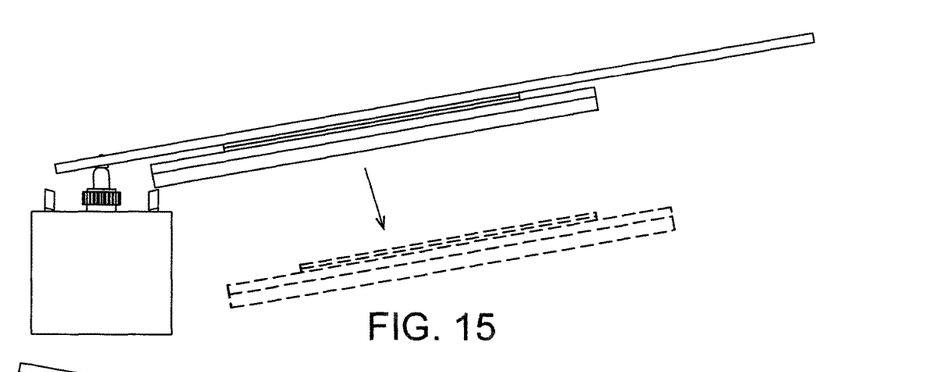
FIG. 15 is a rear elevation view of FIG. 1 thereof, showing the lid assembly in an open configuration.
Figure 16:
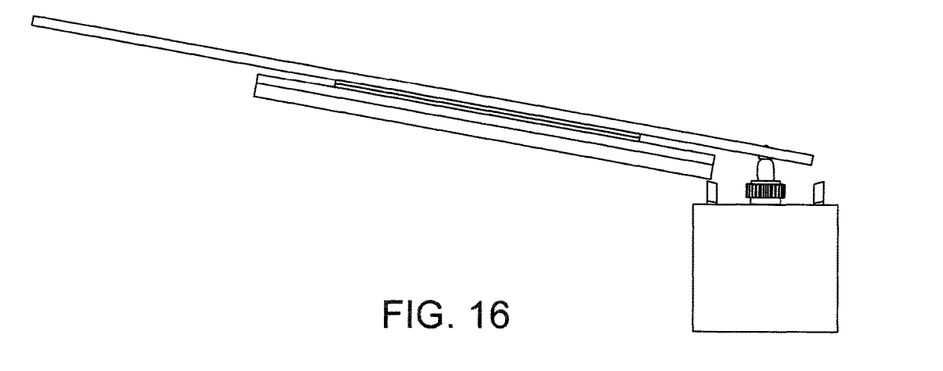
FIG. 16 is a front elevation view of FIG. 1 thereof, showing the lid assembly in an open configuration.

When the cam is in an unfastened position, as depicted in FIG. 11, the ends of the cam are parallel relative to the housing and are turned away from the soundboard insert to allow removal or insertion of the soundboard inserts 2. When the cam is in a fastened position, as depicted in FIGS. 10 and 17, the ends of the cam are rotatable against the soundboard inserts 2 and are perpendicular relative to the housing. In FIG. 10, one insert is removed for clarity. Initial contact with the soundboard inserts 2 is sufficient to fasten them into place. The cam applies pressure to the soundboard inserts 2, which allows them 2 to remain in contact with the housing. There are no vibrations between the receiving slots within the side walls 4 and base 3 once the inserts 2 are installed and secured. This action is similar to a box call housing having a soundboard integrated into the side walls. In one embodiment, the cam has a length of 1 9/16 inches, a width of 3/8 inches, and a depth of 0.0625 inches. The ends of the cam may have a radius of 0.1875 each.

The fastening means prevents vibrations resulting from a loose fit of the soundboard inserts 2 within the slot in the housing. A loose fitting soundboard insert 2 will not produce sound because the chamber is not completely formed. Depending on the kind of sound desired to be produced, the cam may be rotated into a completely perpendicular (fastened) position, or rotated to any point within the soundboard inserts to create variable pressure exerted on the soundboard inserts 2. The fastening means essentially becomes a sound adjuster fastening means. The thumb screw is tightened to maintain the desired setting of the cam within the soundboard insert 2. When the box call is not in use, the fastening means should remain in an unfastened or disengaged to prevent damage to the soundboard inserts 2 due to pressure being applied over long periods of time.

The lid assembly 1 is essentially an implement, preferably lid, paddle, top, striker, or other member used to strike, slid, rub or otherwise provide contact with the top of each soundboard insert 2 (collectively, "striking" the soundboard insert). The lid 1 includes a handle 11, an elongated body, a bore 12 corresponding to the first end block's 5 bore, a connecting means 9 for connecting the lid assembly onto the housing, and an attachment means 7 for attaching one of a plurality of striker members 6 to the underside of the lid 1. The lid 1 may be made from a black high density polyethylene.

The attachment means 7 includes a first mating end that attaches to the bottom of the lid 1 and a second corresponding mating end that attaches to the top of the striker member 6. This also allows for quick-release of the striker member 6 from the lid 1. The attachment means 7 may be selected from the group consisting of re-closable fasteners, hooks and loops, adhesives, a first mating end and a second mating end, and combinations thereof. Preferably, the attachment means is a re-closable fastener. In one embodiment, the attachment means has 2 lengths of 4 inches and 2 widths of 1/2 inches.

The striker member 6 is replaceable and interchangeable, and preferably attached to the underside of the lid 1. This allows the user to exchange the type of striker member 6 used for striking the soundboard insert 2, without the need to remove the entire lid assembly from the box call or to use an entirely different box call. The striker member 6 has a bottom surface that strikes against the soundboard inserts 2, and a top surface having the second mating end of the attachment means for attaching to the first mating end located on the bottom of the lid 1. The bottom of the attachment means 7 may have a slight rounded or domed underside. It also has a body having a length that substantially corresponds to the length of the soundboard insert 2 and a width that substantially corresponds to the width of the front and rear ends of the side walls 5. The striker member 6 may be made from woods selected from the group consisting of red cedar, black cherry, black walnut, hard maple, purple heart, and combinations thereof. Alternatively, it may be made from any suitable material capable of producing the desired sound.

To replace the striker member 6, the lid assembly 1 is rotated or pivoted outwardly and away from the box call to an open position or configuration, as shown in FIGS. 10-16. The lid 1 may be opened to 180 degrees from the closed position, which is parallel to the housing. The striker member 6 is pulled downwardly with enough force to overcome the hold of the mating ends. The user should avoid contact with the friction surface on underside of the striker member 6. Another striker member 6 may then be installed by aligning the second mating end on the striker member 6 with the lid's 1 first mating end and by pressing the attachment means 7 into place. The lid 1 is then rotated back to a closed position or configuration (FIG. 1), and is ready for use. The lid 1 itself need not be removed from the housing during installation or removal of the attachment member 6. When in a closed configuration, as depicted in FIG. 1, the lid 1 is essentially parallel to the base 3.

In one embodiment, the overall length of the striker member is approximately 10 1/4 inches, a depth of approximately 1/8 inch, and a width of approximately 1 7/8 inches. The bore may have approximately 5/8 inches from the forward edge of the striker member to the center of the bore. The handle may have a length of approximately 2 3/4 inches. The length of the attachment member is approximately 6 inches with a thickness of approximately 9/32 inches, a width of approximately 1 7/8 inches and a rounded underside having a approximately 2 7/16 inch radius. The first mating end of the attachment means may have widths of approximately 1/2 inches, a depth of approximately 3/32 inches, and a length of approximately 4 inches. The attachment means may be spaced approximately 2 inches from the rearward edge of the striker member.

The lid assembly 1 may be removed from the housing by unlocking the connecting means 9. In one embodiment, the connecting means 9 includes an externally threaded fastener also used as a finger grip, a socket, and a locking nut. Preferably, the fastener is a screw stud, and the locking nut is a thumb nut. The locking nut is positioned between the bores on the housing and the striker member 1 before inserting the fastener. The fastener is turned clockwise to adjust the fit of the lid 1 on the housing. The angle of the lid assembly's 1 contact with the housing, and more preferably the soundboard inserts 2, can be adjusted and fine tune by loosening the locking nut and raising or lowering the fastener before retightening the locking nut. This adjustment aids in controlling the sound produced by the box call. For example, the sound in operation of a high-pitched tone rolling over to a low-pitched tone as the lid 1 passes over the top radius of the soundboard insert 2. To release or remove the lid assembly 1 from the housing, the lid 1 is opened 180° from the closed position then the handle is pushed or pressed downwardly to release the fastener or stud from the socket. To install the lid assembly 1, the bore 12 in the lid 1 is aligned with the bore in the first end block, and a fastener is inserted into a socket within the first end block's bore and is pressed down until it connects or snaps into place.

The method of using the box call to produce a sound that imitates a turkey's call comprises the steps of:

1. pivotably rotating the lid of the box call described in claim 1 into an open position or configuration to access the striker member and each soundboard insert;

2. removably detaching the striker member by exerting enough force to overcome the attachment of the mating ends by pulling the striker member downwardly, and by aligning another striker member made from a different material and pressing the striker member's mating end with the lid's mating end;

3. unfastening the fastening means to slidably insert one or more soundboard inserts into each receiving slot in the housing, adjusting the fastening means within each soundboard insert, and fastening the fastening means into the soundboard insert forming a sound chamber;

4. adjusting the sounds produced by the box call by striking the striker member against the top of one or both soundboard inserts.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

The invention claimed is:

1. A box call comprising:
   (a) a housing having at least one receiving slot, at least one of a plurality of soundboard inserts insertable into said receiving slot to form a sound chamber for producing one or more one sounds being substantially similar to one or more of a turkey's calls, and a fastening means for simultaneously fastening each of said soundboard inserts to said housing and varying the sound; and
   (b) a lid assembly having a lid, an attachment means for selectively attaching one of a plurality of striker members to said lid, and a connecting means for pivotably connecting said lid assembly to said housing.

2. The box call of claim 1, said housing further comprising a base, a first upstanding end block, a second upstanding end block, two opposing side walls, with each of said end blocks and each of said side walls abutting each respective end of said base, and said receiving slot extending downwardly near the end of each respective said end blocks and into said base and each respective said side walls.

3. The box call of claim 1, each of said soundboard inserts comprising a panel having an arcuate upper edge for engaging with said striker member, and an inside face of said panel for engaging with said fastening means.

4. The box call of claim 1, each of said soundboard inserts being made from woods selected from the group consisting of butternut, poplar, yellow poplar, sassafras, mahogany, red cedar, cherry, black cherry, walnut, black walnut, purple heart, ebony, holly, chinaberry, teak, cedar, ponderosa pine maple, hard maple, African mahogany, and combinations thereof.

5. The box call of claim 4, said fastening means comprising a spacer fastened within said base and supporting an outstanding rotatable cam engageable with said soundboard inserts, and a thumb screw atop said cam that may be turned to loosen or tighten said engagement of the cam against said soundboard inserts.

6. The box call of claim 5, said striker member made from woods being selected from the group consisting of red cedar, black cherry, black walnut, hard maple, purple heart, and combinations thereof.

7. The method of using the box call of claim 5 to produce a sound that imitates a turkey's call comprising the steps of:
   (a) pivotably rotating the lid assembly of the box call described in claim 5 into an open position or configuration to access the striker member and each soundboard insert;
   (b) removably detaching the striker member by exerting enough force to overcome the attachment of the mating ends by pulling the striker member downwardly, and by aligning another striker member made from a different material and pressing the striker member's mating end with the lid's mating end;
   (c) unfastening the fastening means to slidably insert one or more soundboard inserts into each receiving slot in the housing, adjusting the fastening means against each soundboard insert, and fastening the fastening means against the soundboard insert for forming a sound chamber;
   (d) adjusting the sounds produced by the box call by striking the striker member against the top of one or both soundboard inserts.

8. The box call of claim 1, said lid assembly further comprising a handle and said lid having a body having a bottom for mating with said attachment means and a central bore near an end opposite said handle and corresponding with a central bore in said first end block for engaging said connecting means.

9. The box call of claim 8, said attachment means being selected from the group consisting of re-closable fasteners hooks and looks, snaps, a first mating end and a second mating end, and combinations thereof.

10. The box call of claim 9, said striker member made from woods being selected from the group consisting of red cedar, black cherry, black walnut, hard maple, purple heart, and combinations thereof.

11. The box call of claim 1, the assembly of said box call having said soundboard insert and said striker member being a collection for producing specific turkey calls, said collection selected from the group consisting of:
   (a) said striker member being red cedar wood and said soundboard insert being butternut, yellow poplar, or red cedar woods;
   (b) said striker member being black cherry wood and said soundboard insert being Butternut, yellow poplar, red cedar, mahogany, sassafras, or black cherry woods;
   (c) said striker member being black walnut wood and said soundboard insert being butternut, yellow poplar, red cedar, sassafras, mahogany, black cherry, or black walnut woods;

(d) said striker member being hard maple wood and said soundboard insert being butternut, yellow poplar, red cedar, mahogany, black walnut, black cherry, or hard maple woods; and (e) said striker member being purple heart wood and said soundboard insert being butternut, yellow poplar, red cedar, sassafras, black cherry, black walnut, or hard maple woods.

12. The box call of claim 1, said connecting means comprising an externally threaded fastener, preferably a screw stud, capable of being a finger grip, and a locking nut, preferably a thumb nut, insertable through the bores of said first end block and said lid; said fastener for selectively adjusting the position of the lid assembly on said housing.

13. The box call of claim 1, the sounds produced by said box call may be selected from the group consisting of yelps, clucks, cuts, purrs, putts, kee kees, cackles, gobbles, assembly calls, tree calls, and combinations thereof.

14. The box call of claim 13, said attachment means being selected from the group consisting of re-closable fasteners, hooks and looks, snaps, a first mating end and a second mating end, and combinations thereof.

15. The box call of claim 13, said connecting means comprising an externally threaded fastener, preferably a screw stud, capable of being a finger grip, and a locking nut, preferably a thumb nut, insertable through the bores of said first end block and said striker member; said fastener for selectively adjusting the position of the striker member on said housing.

16. The box call of claim 13, the sounds produced by said box call may be selected from the group consisting of yelps, clucks, cuts, purrs, putts, kee kees, cackles, gobbles, assembly calls, tree calls, and combinations thereof.

17. The box call of claim 1, each of said soundboard inserts being made from woods selected from the group consisting of butternut, poplar, yellow poplar, sassafras, mahogany, red cedar, cherry, black cherry, walnut, black walnut, purple heart, ebony, holly, chinaberry, teak, cedar, ponderosa pine, maple, hard maple, African mahogany, and combinations thereof.

18. The box call of claim 1, assembly of said box call having said soundboard insert and said striker member being a collection for producing specific turkey calls, said collection selected from the group consisting of:

(a) said striker member being red cedar wood and said soundboard insert being butternut, yellow poplar, or red cedar woods;

(b) said striker member being black cherry wood and said soundboard insert being butternut, yellow poplar, red cedar, mahogany, sassafras, or black cherry woods;

(c) said striker member being black walnut wood and said soundboard insert being butternut, yellow poplar, red cedar, sassafras, mahogany, black cherry, or black walnut woods;

(d) said striker member being hard maple wood and said soundboard insert being butternut, yellow poplar, red cedar, mahogany, black walnut, black cherry, or hard maple woods; and (e) said striker member being purple heart wood and said soundboard insert being butternut, yellow poplar, red cedar, sassafras, black cherry, black walnut, or hard maple woods.

19. A box call comprising:

(a) a housing having a base, a first upstanding end block having a bore on its top face, a second upstanding end block, each of said end blocks abutting an end of said base, two receiving slots extending downwardly in an angle near the end of each respective said end blocks and into said base and each respective said side walls, two of a plurality of soundboard inserts for inserting into each of said receiving slots, each of said soundboard inserts engaging with a fastening means for varying the sound; and (b) a lid assembly having a lid, a handle, a body, with said body having a bore corresponding with said first end block bore, a connecting means for connecting said lid to said housing, and an attachment means having mating ends attached to the bottom of said lid and a corresponding second mating end attached to the top of one of a plurality of striker members for attaching said striker member to said lid.

20. The box call of claim 19, said fastening means comprising a fastener, preferably a spacer, a cam insertable into said fastener, and a thumb screw, said cam fastened against said soundboard inserts, wherein said fastening means rotatable from a fastened position to an unfastened position, said base further comprising a threaded pilot hole for receiving said fastener.

\* \* \* \* \*